United States Patent
Lim et al.

(12)

(10) Patent No.: US 6,309,680 B1
(45) Date of Patent: Oct. 30, 2001

(54) PELLETIZATION PROCESS

(75) Inventors: Bee Gim Lim, Singapore (SG); Thang Ho Dac, Le Mont sur Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/617,943

(22) Filed: Aug. 29, 2000

Related U.S. Application Data

(63) Continuation of application No. PCT/EP99/01133, filed on Feb. 23, 1999.

(30) Foreign Application Priority Data

Mar. 5, 1998 (SG) .................................................. 9800488

(51) Int. Cl.[7] ..................................................... A23L 1/10
(52) U.S. Cl. ................ 426/28; 426/52; 426/560
(58) Field of Search .................... 426/496, 511, 426/622, 656, 560, 44, 49, 52, 18, 96, 94, 503, 28; 435/252.4, 256.1, 171, 71.1

(56) References Cited

U.S. PATENT DOCUMENTS

| | | |
|---|---|---|
| 5,523,100 | 6/1996 | Teh .......................................... 426/46 |
| 5,652,004 | 7/1997 | Nagata et al. .......................... 426/44 |

FOREIGN PATENT DOCUMENTS

| | | |
|---|---|---|
| 0 640 294 | 3/1995 | (EP) . |
| 0 711 510 | 5/1996 | (EP) . |
| 0 824 873 | 2/1998 | (EP) . |
| 62-118880 | 5/1987 | (JP) . |

*Primary Examiner*—Keith Hendricks
(74) *Attorney, Agent, or Firm*—Winston & Strawn

(57) ABSTRACT

A process for the production of a fermenting material which includes the steps of forming a dough by adding water to a dried gluten in an amount of from at least 19% to 60% by weight, pelletizing the dough to form pellets, and sterilizing the pellets by steam treatment. The gluten may be rice gluten, corn gluten, wheat gluten or combinations thereof. Also, a fermenting material obtained by this process. This fermenting material can be inoculated with a microorganism and fermented to form a fermention product that can be used as a food sauce, flavoring or seasoning additive.

19 Claims, No Drawings

PELLETIZATION PROCESS

CROSS REFERENCE TO RELATED APPLICATIONS

Continuity Statement This application is a continuation of the U.S. National Phase of International Application No. PCT/EP99/001133, filed Feb. 23, 1999, the content of which is expressly incorporated herein by reference thereto.

FIELD OF THE INVENTION

The present invention relates to a pelletization process, and more particularly to a process for the pelletization of a dried gluten material which may be used as a fermenting material for the production of fermented products such as soy sauce and seasonings.

BACKGROUND OF THE INVENTION

U.S. Pat. No. 5,652,004 ("Nagata") discloses a process for the production of a fermenting material which comprises using 5–100% by weight of a dried gluten product and 0–95% by weight of wheat as a raw material, adding steam to the material to adjust the moisture content upon granulating to within a critical range of 12–18%, and granulating the material followed by steaming. The initially dry gluten product used in Nagata includes dried wheat gluten product, dried corn gluten product and the like. The steaming step is said to denature the wheat gluten. The adjustment of moisture content to the required range is considered to facilitate the granulation of the gluten dough, which upon steaming, gives rise to satisfactory denaturation of protein. Nagata states that if more than 18% or less than 12% moisture is imparted on the dough via steaming, granulation would not be possible.

In addition, Nagata cites a number of Japanese references disclosing various processes for preparing a fermenting material using wheat gluten. The cited processes all require a denaturation step via steam treatment of the gluten dough which is formed by adding water to wheat gluten. As stated in Nagata, directly adding water to wheat gluten immediately followed by steaming leads to inefficient denaturation of the gluten dough. This occurs because the inner portion of the large dough mass obtained from a process according to the cited references cannot be effectively denatured by steaming.

On the other hand, when steam is directly added to a dried gluten product, as when saturated steam is added to a dried vital wheat gluten, undesirable hard lumps form which have to be sieved away. This causes an additional processing step and loss of materials. Also, it is quite difficult to achieve a moisture content of from 12–18% by steaming, especially on a large-scale production.

JP 62-118880 discloses a method of preparing a brewing material for koji, by heating flour to denature its protein, hydrating to a moisture content of 30 to 50%, and then granulating and steaming the material to form a product.

Thus, there exists a need for a simplified process for preparing a fermenting material that can be used for the production of fermented products such as sauces and seasonings wherein the process eliminates the need for the thermal denaturation of the gluten dough. The present invention provides such process as well as fermentation products obtained from fermenting materials that are prepared from that process.

SUMMARY OF INVENTION

The present invention provides a process for pelletizing materials which may be used in the manufacture of fermentation-derived products such as koji and other types of food flavorings, seasonings, and food additives. The process of the present invention does not require steam treatment to thermally denature the gluten dough. A preferred embodiment of the present invention involves forming a dough by adding water in an amount of at least 19% to 60% by weight into dried gluten, pelletizing the dough, and sterilizing the resulting pellets by steam treatment.

In addition to providing a process for preparing a fermenting material, the present invention solves the problems arising from the gluten's vitality by devitalizing the wheat gluten before the pelletization step. Devitalization, which can be achieved by heat treatment of the gluten dough, is part of the denaturation process involving vital gluten. While devitalization can be achieved by steam treatment, devitalization according to the process of the present invention can instead be performed using a dry heat treatment. Upon devitalization, water may be added in an amount of from at least 19% to 60%, depending on the degree of devitalization, to form the dough and facilitate pelletization. Additional water may be added to the pellets, if necessary, to adjust the moisture content to at least 30% to 50% based on the weight of the pellets. This would normally be done before the sterilization or pasteurization step. By this process, lumps are avoided so that no loss of materials occurs.

The pellets produced according to the process of the present invention can be used as a fermenting material for the production of a fermentation-based product such as a food seasoning or sauce, and preferably a koji product.

DETAILED DESCRIPTION OF THE INVENTION

As used herein, the term "pelletizing" or "granulating" means converting a material into pellets, grains, granules, or other relatively small particles. Similarly, the word "pellets" is intended to encompass grains, granules, and other relatively small particles. Preferably, the dried gluten is wheat gluten, corn gluten, or rice gluten. One or more types of gluten may be used to produce the pelletized material.

When dried wheat gluten is used, it is advantageous to devitalize the wheat gluten before adding water, even though devitalization is not required. Devitalization can be carried out by heating at 60° C. or higher using means such as hot air or by contact with a hot surface or hot air, e.g., in a drier, oven, or a steam-jacketed vessel. Other suitable means of heat treatment may be employed. Devitalization may be performed from 5 seconds to 3 hours, depending on the temperature used. Lower temperatures normally require a longer devitalization treatment time. The devitalization may be carried out between 60° C. to 200° C. over a period of from 5 seconds to 3 hours, preferably from 100° C. to 120° C. over a period of from 5 minutes to half an hour. In general, the temperature and duration of heating employed depend partly on the composition of the starting materials used to form the desired product.

If wheat is to be mixed with dried gluten, it should preferably be done before adding water. The added wheat, which is used mainly as a carbohydrate source, can be wheat flour, wheat bran, or other conventional forms of wheat. The amount of wheat can be up to 90%, preferably from 5% to 50%, and more preferably from 10% to 35% of the total weight of the wheat and dried gluten.

The amount of water added to the dried gluten, which depends upon the vitality of the gluten as well as the composition of the raw materials, is at least 19% by weight and generally from 25% to 60% by weight. Additional water may be added to the pellets before sterilization by steaming to increase the moisture content of the pellets to at least 30% to 50% by weight.

The dough may be pelletized by conventional means such as a screw press, meat mincer, or pellet mill. The pellets generally have a cylindrical shape with an average diameter of from 1 mm to 10 mm, preferably from 2 mm to 8 mm, and more preferably from 4 mm to 6 mm. They may also have a spherical shape with a diameter of from 1 mm to 10 mm, preferably from 2 mm to 8 mm, and more preferably from 4 mm to 6 mm. The pellets may also be formed into other shapes such as cubes or rectangles or others having polygonal, oval or circular cross sections.

After cooling, the pellets may then be used to prepare a product such as koji by mixing them with carbohydrates, inoculating with Aspergilli or other suitable microorganisms, and fermenting the inoculated mixture for two days or more. In addition to carbohydrates, one or more protein sources may also be incorporated as starting materials for preparing a gluten-derived material or product. This material or product may then be converted into a food product such as a seasoning using conventional methods. One may also use a method described in U.S. Pat. Nos. 5,888,561 and 5,965,178, the entire disclosures of each of which are expressly incorporated herein by reference thereto.

The use of the pellets of the present invention in a fermentation process provides a good hydrolysis yield due to the ease of disintegration of the pellets during hydrolysis. The large surface area of the pellets allows efficient contact and interaction between the pellets and other materials and by-products present in a fermentation mixture. The product derived from the fermentation of the pellets may be used in the preparation of flavorings, flavor mixes, sauces, and other types of food additives.

Advantageously, the process may be carried out continuously using, for example, a noodle line concept. A useful continuous process under the present invention would typically include the following steps: mixing the ingredients (such as dried devitalized gluten, wheat flour, and wheat bran), pelletizing, adding water, steaming, cooling, and inoculating the pellets. A substrate comprising the inoculated pellets is then loaded into a machine or apparatus for fermentation and subsequent hydrolysis.

EXAMPLES

The following examples illustrate the preferred embodiments of the invention. Unless otherwise indicated, the compositions in % are given in terms of weight.

Example 1

Vital wheat gluten weighing 35 kg was devitalized by heating at 100° C. in a ribbon blender with a steam jacket for 30 minutes. The devitalized wheat gluten was mixed with 2.5 kg of wheat bran and 12.5 kg of wheat flour. Water was added to the mixture to obtain a moisture content of 33%. The dough formed was then fed into a mincer to produce cylindrical pellets each having a diameter of 5 mm. Additional water was added to the pellets to increase their moisture content to 47%. The pellets were then steamed at 100° C. for 10 minutes and cooled afterwards to below 40° C. The cooled pellets were mixed with a liquid suspension containing 25 g of *Aspergillus oryzae* spores inoculum. Koji fermentation was carried out for 42 hours at 27–33° C. The matured koji was hydrolysed by adding water to obtain a hydrolysate with a total solid content of 20.2%. The hydrolysis was carried out at 40° C. for two weeks. This was followed by two weeks of moromi fermentation wherein salt was added at 12%. Pressing the moromi yielded a clear sauce which was heat-treated at 90° C. for 20 minutes. The product thus obtained had a light color, good taste, and excellent flavor.

Example 2

Water was added directly to a mixture of 35 kg of rice gluten, 2.5 kg of wheat bran and 12.5 kg of wheat flour to obtain 45% moisture. The dough formed was then fed into a mincer to produce cylindrical pellets each having a diameter of 5 mm. A similar procedure for steaming, koji making, and sauce preparation was followed as in Example 1. The product thus prepared had a light color, good taste, and excellent flavor.

Example 3

A similar procedure was carried out as in Example 2, except that corn gluten powder was used instead of rice gluten powder. Also, the moisture content of the dough before pelletization was initially 35%. Additional water was added to the pellets before steaming to increase the moisture content of the pellets to 47%. The product thus prepared had a light color, good taste and excellent flavor.

Example 4

A similar procedure was carried out as in Example 1, except that 35 kg of devitalized wheat gluten was mixed with 2 kg of wheat bran and 4 kg of wheat flour. Here, enough water was added to give a moisture content of 40% before pelletization.

Example 5

A similar procedure was carried out as in Example 1, except that 35 kg of devitalized wheat gluten was mixed with 5 kg of vital wheat gluten, 2.4 kg of wheat bran, and 4.7 kg of wheat flour. Enough water was added to give a moisture content of 33% before pelletization.

Example 6

A similar procedure was carried out as in Example 1, except that the devitalization of wheat gluten was carried out by directly applying superheated steam at 1 bar and 150° C. to the wheat gluten. The devitalization was done before mixing with the carbohydrates and forming the pellets.

Example 7

A similar procedure was carried out as in Example 1, except that the devitalization of wheat gluten was carried out in a fluidized bed drier with the inlet air temperature set at 110° C.

Example 8

A similar procedure was carried out as in Example 1, except that the diameter of the pellets were 3 mm.

Example 9

A similar procedure was carried out as in Example 1, except that pelletization was carried out using a screw press.

Example 10

A similar procedure was carried out as in Example 1, except that the pelletizer used produced spherical granules with diameters ranging from 3–8 mm.

Example 11

A similar procedure was carried out as in Example 1, except that 25 kg of corn gluten pellets, which were prepared as described in Example 3, were fermented together with wheat gluten pellets.

Example 12

A similar procedure was carried out as in Example 3, except that 35 kg of wheat gluten, which was devitalized as described in Example 1, was mixed with 35 kg of rice gluten, 5 kg of wheat bran, and 25 kg of wheat flour before the pelletization step.

Example 13

A similar procedure was carried out as in Example 11, except that 40 kg of steamed, defatted soya bean mill was used instead of corn gluten.

Example 14

A similar procedure was carried out as in Example 1, except that the wheat flour and wheat bran were mixed with vital wheat gluten before devitalization.

Example 15

A similar procedure was carried out as in Example 1, except that an inoculum of lactic acid bacteria at $7 \times 10^5$ cfu/g was added to the steamed pellets before koji fermentation, and hydrolysis was carried out at 35° C. for 2 days. Pressing was performed after hydrolysis and salt was added at 12%.

Example 16

A similar procedure was carried out as in Example 1, except that the devitalization step was omitted, and water was added to the mixture of wheat gluten, wheat bran, and wheat flour to obtain a moisture content of 20%.

Various modifications may be made to the embodiments and examples provided herein without departing from the scope of the invention. Thus, the embodiments and examples described herein should not be construed as limiting the invention in any manner.

What is claimed is:

1. A process for the production of a fermenting material which comprises:
   forming a dough by adding water to a dried gluten in an amount of from 19% to 60% by total weight of the dough;
   pelletizing the dough to form pellets; and
   sterilizing the pellets by steam treatment to form the fermenting material.

2. The process according to claim 1, which further comprises adding water to the dough before sterilizing the pellets to adjust the moisture content to from 25% to 50% by weight based on the weight of the pellets.

3. The process according to claim 1, wherein the gluten is wheat gluten and which further comprises devitalizing the wheat gluten before adding water to the dried gluten.

4. The process according to claim 3, wherein the devitalization is carried out at a temperature of from 60° C. to 200° C. over a period of from 5 seconds to 3 hours.

5. The process according to claim 4, wherein the devitalization is carried out using a dry heat treatment using hot air or by contact with a hot surface or hot air in a drier, oven, or stem jacketed vessel.

6. The process according to claim 4, wherein the devitalization is carried out by means of a fluidized bed drier.

7. The process according to claim 4, wherein the devitalization is carried out by means of superheated steam.

8. The process according to claim 1, further comprising adding wheat to the dried gluten in an amount of as high as 90% by weight of the wheat and dried gluten before adding the water to the dried gluten.

9. The process according to claim 3, further comprising adding wheat to the dried gluten in an amount of as high as 90% by weight of the wheat and dried gluten before devitalizing the wheat gluten.

10. The process according to claim 8, wherein the wheat to be added is wheat flour or wheat bran.

11. The process according to claim 1, wherein the dough is pelletized by passing through a screw press, a meat mincer, or a pellet mill.

12. The process according to claim 1, wherein the pellets have a cylindrical or spherical shape and an average diameter of from 1 mm to 10 mm.

13. The process according to claim 1, wherein more than one type of gluten is used to produce the dough.

14. The process according to claim 1, wherein the dried gluten is vital wheat gluten, corn gluten, or rice gluten.

15. A process of preparing a fermentation product which comprises:
   preparing a substrate by mixing at least one carbohydrate source with pellets produced according to the process of claim 1;
   inoculating the resulting substrate with a fermentation microorganism; and
   fermenting the inoculated substrate.

16. The process according to claim 15, wherein the microorganism is Aspergillus.

17. The process according to claim 15, which further comprises adding at least one additional substrate comprising a protein source.

18. The process according to claim 15, which further comprises hydrolyzing the fermented substrate for at least one day.

19. The process according to claim 15, wherein moromi is produced by the fermenting step.

* * * * *